May 13, 1930.                    H. P. DORN                    1,758,189
                          ELECTRIC PHONOGRAPH MOTOR
                   Filed March 31, 1926      3 Sheets-Sheet 1

Inventor
Harry P. Dorn
By
Ray S. Isham  Attorney

May 13, 1930. H. P. DORN 1,758,189
ELECTRIC PHONOGRAPH MOTOR
Filed March 31, 1926 3 Sheets-Sheet 2
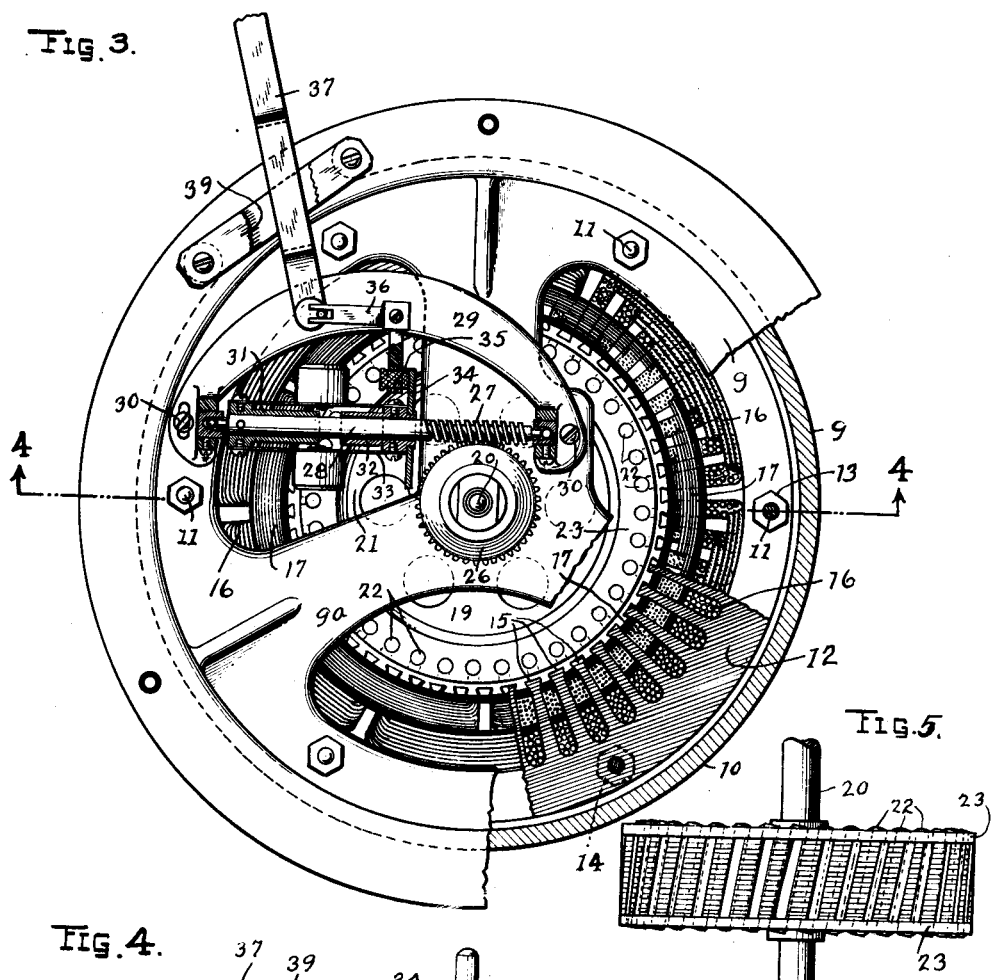
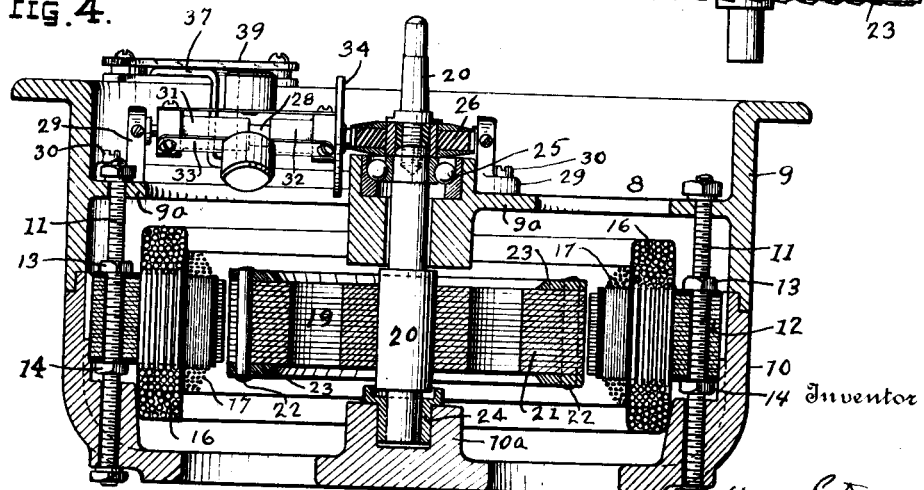

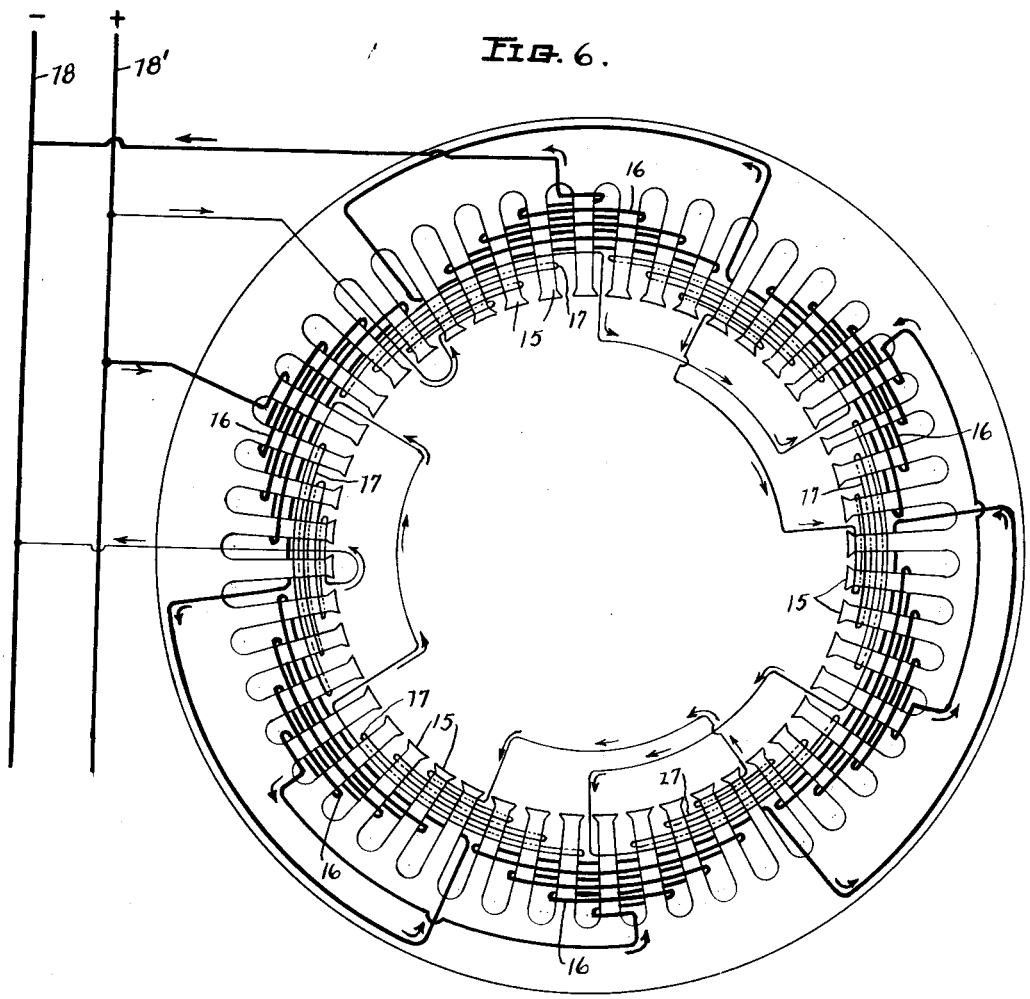

Patented May 13, 1930

1,758,189

UNITED STATES PATENT OFFICE

HARRY P. DORN, OF CLEVELAND, OHIO, ASSIGNOR TO RAY S. GEHR, OF SHAKER HEIGHTS, OHIO

ELECTRIC PHONOGRAPH MOTOR

Application filed March 31, 1926. Serial No. 98,902.

This invention relates to electric motors especially adapted for the rotation of the record tables or supports of phonographs or talking machines.

Some of the more important objects of the invention are comprehended in the provision of an alternating current motor which when directly connected to the record table or support of a phonograph is adapted to drive the table or support at a highly uniform, suitably slow speed and with ample torque notwithstanding wide variations of the voltage and frequency of the current supply.

Another object of the invention is the provision of a motor of the character referred to that is quiet in operation.

A further object of the invention is the provision of a motor for the service specified above that is simple in construction, dependable in operation and adapted to be produced at moderate cost.

Further objects, more or less incidental or ancillary to the foregoing will appear in the following description in connection with the accompanying drawings which show preferred embodiments of the invention.

In the drawings, Fig. 1 is a sectional plan view of my improved motor mounted in a phonograph case, a part of the record and record support being broken away and the section being taken on the broken line 1—1, Fig. 2.

Fig. 3 is a plan view of the motor on a larger scale with some of the parts broken away and some shown in section.

Fig. 4 is a vertical section on the line 4—4, Fig. 3.

Fig. 5 is a side elevation of the rotor of the motor showing the spiral or skew arrangement of the conductors.

Fig. 6 is a wiring diagram of the stator of the motor.

Figure 1:
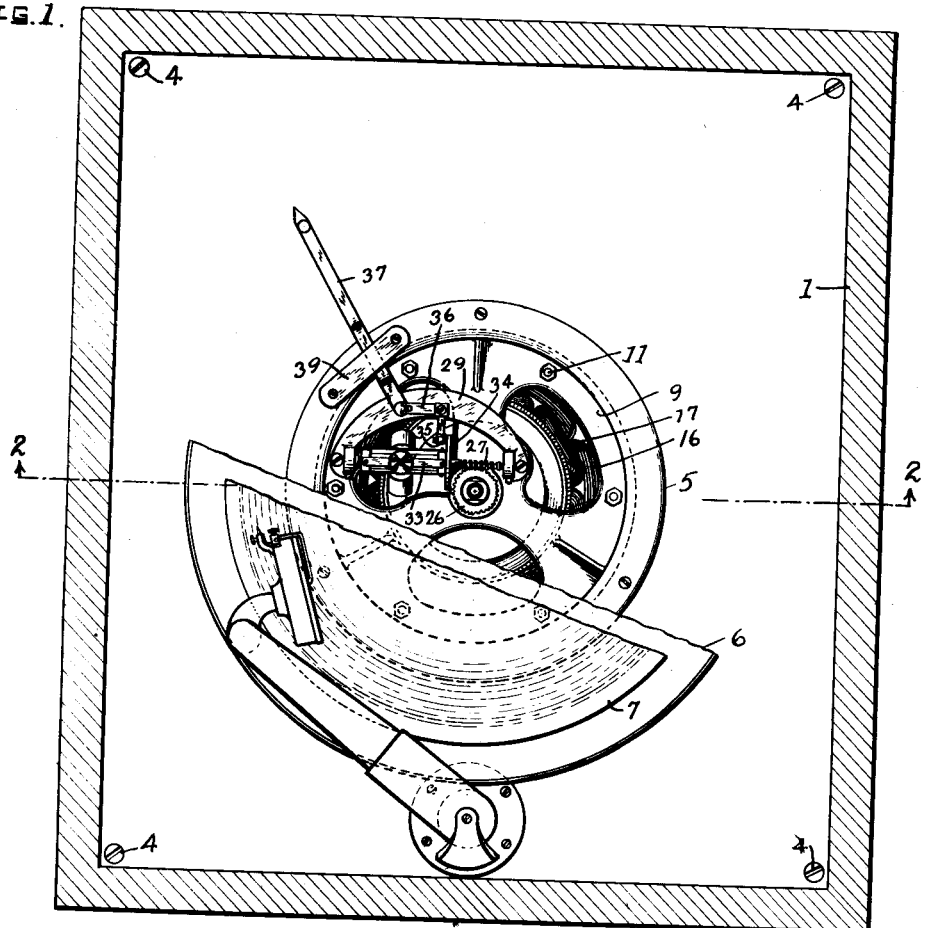
Figure 2:
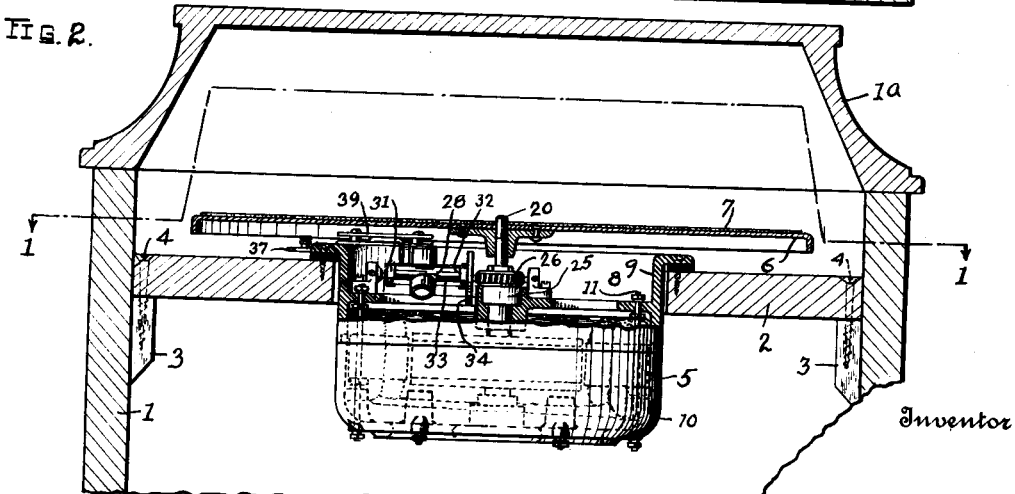
Fig. 2 is a vertical section on the line 2—2, Fig. 1, with the lower part of the motor in elevation.

Referring in detail to the construction illustrated in Figs. 1 to 6, inclusive, 1 designates the phonograph case which comprises the usual hinged cover 1ª. 2 is a motor-supporting board preferably detachably secured within the case 1. As shown the board 2 rests upon blocks 3 and is secured thereto by screws 4. The motor 5 is supported on board 2 and has its vertically disposed shaft or spindle arranged to carry the rotatable turn-table or record support 6 which is adapted to support the usual disc type of records, one of which is shown at 7.

The motor 5 is of the split-phase induction type and is adapted to operate at phonograph speed on 110-volt, single-phase alternating current circuits with frequencies ranging from 25 to 60 cycles per second.

Referring now more particularly to Figs. 3 and 4, the motor comprises a stator frame and casing structure designated in its entirety by 8 and having upper and lower sections 9, 10. In the construction illustrated these two sections are in the form of castings and the preferably made of light-weight metal such as aluminum alloy. The two sections are firmly secured together by bolts 11, 11 on which is mounted the laminated iron annular field structure 12. The annular structure 12 is firmly supported on the bolts 11 by nuts 13, 14 and is slotted to form a series of teeth or pole sections 15. On these pole sections the coils of the exciting or primary windings are wound. The field windings consist of one series of coarse wire coils 16 and a series of fine wire coils 17, the coils of the two series being in alternating or staggered relation, as shown in Figs. 3 and 6 and forming corresponding series of poles. The coarse wire coils are connected in series with each other and across the line, as are also the fine wire coils. The line or source is represented in Fig. 6 by the conductors 18, 18'. In Fig. 6 the plus and minus signs and the arrows represent the directions of the currents at a given instant. In the motor illustrated with the laminated iron sections of the rotor and stator one inch thick and outside diameter for said iron sections of four inches and seven inches, respectively, the coarse wire coils of the primary are made of No. 27 copper wire with a total length for the six coils of 2950 feet and with 845 turns per pole, while the fine wire coils are made of No. 33 copper wire with a total length for the six poles of 1710 feet and with 507 turns per pole. With the coils thus wound the current flowing in the coarse wire coils is displaced in phase relative to that flowing in the fine wire coils in the well-known manner, the relatively large inductance of the coarse wire coils causing the current therein to lag relative to the impressed voltage more than the current in the fine wire coils.

The rotor of the motor, designated in its entirety by 19, consists of a shaft or spindle 20 and a laminated cylindrical iron section 21 peripherally slotted to receive conductor rods 22 which, in the motor shown, are formed of No. 6 copper wire. The conductors 22 are short-circuited on themselves by connection with brass or copper rings 23 which are formed with apertures to receive the ends of conductors 22 and said ends are riveted down and soldered to provide close contact and secure the parts of the structure rigidly together. I prefer to dispose the conductors 22 in skew or spiral relation to the rotor axis, rather than parallel to it, and to accomplish this I make the conductor slots in the iron laminæ and the holes in the end rings 23 large enough to permit a twisting or skewing of the laminæ and rings with the conductors therein. Then the conductor ends are riveted down and soldered and the resulting structure is forced upon the rotor shaft. Preferably the shaft section that receives the laminæ is slightly fluted to insure a rigid driving connection between the laminæ and the shaft.

At its lower end the rotor shaft 20 is guided by a plain bearing sleeve 24 mounted in a boss 10ᵃ of the frame casting. At its upper end the rotor shaft is rotatably supported by an anti-friction bearing 25. Above said anti-friction bearing and fast on the shaft 20 is a worm wheel 26 with its teeth adapted to drive a worm 27 formed on the spindle 28 of a centrifugal governor. The spindle 28 is mounted at its ends in a supporting frame 29 secured by screws 30 to the top of the web 9ᵃ of the motor frame casting 9. On the spindle 28 is fixedly secured a sleeve 31 and a sleeve 32 is slidably mounted on said spindle, the two sleeves being connected by the usual weighted spring arms 33. The sleeve 32 carries a friction disc 34 which moves axially with the sleeve 32 against a brake block 35 mounted in a bell-crank 36 on the frame 29. The position of the bell-crank 36 and consequently of the brake block 35 is adjustable by means of a lever 37 pivotally mounted on the frame 38 and frictionally held in adjusted position by the spring clamp 39. By adjustment of lever 37 the governor is caused to regulate the speed of the motor and turn-table in the well-known manner, the speed ordinarily being held down to 78 or 80 R. P. M.

Motors of the type above described have not heretofore been used or proposed for the driving of phonographs doubtless because of the difficulty of producing such a motor capable of running at a slow speed of 78 or 80 R. P. M. The motor above described has a synchronous speed of about 1200 R. P. M. If the motor is constructed with a large number of poles to reduce this synchronous speed the result is a motor unduly large in size and commercially prohibitive in cost. On the other hand, if motors of this type designed in accordance with prior design practice are braked down from their synchronous speeds to phonograph speeds they are almost certain to burn out, the current drawn by the primary circuit windings being variable with the rotor speed, and in addition are certain to be noisy on account of the so-called alternating current hum of the iron laminæ of the magnetic circuit.

I have entirely overcome these difficulties by providing the motor described with only a moderate number of poles but with its conductors and iron sections proportioned in such a way as to give the motor a very abnormally high impedance. Thus in the motor above described the number of turns in the primary windings is made relatively large. Also the cross section of the iron through both the primary and the secondary windings is made relatively large for the current flowing in the windings, the length of the magnetic paths through the coils is kept as small as possible and the air gap between the rotor and the stator is made relatively small. Of these several factors the more important are the large number of turns of the primary windings and the relatively large iron sections. The conductors and iron sections of my improved motor can be comprehensively characterized by the statement that the apparent average air gap flux density of the motor is very low in comparison with motors of the same type as heretofore made. To be specific, the motor above described has an apparent average air gap flux density ranging from about 3000 lines per square inch when operating on 110-volt, 60 cycle current to about 7000 lines per square inch when operating on 110-volt, 25 cycle current, whereas the corresponding flux densities for motors constructed in accordance with prior commercial design practice range from about 23000 lines per square inch to about 27000 lines per square inch. To secure the major benefits of my invention, the apparent average air gap density of the motor should, I believe, be kept within 10,000 lines per square inch.

To put the matter in another way, while my motor is intended for operation on a 110-volt, alternating current circuit, it has its iron sections and the number of turns of its windings proportioned rather as if the motor were to be operated at synchronous speed on a 550-volt, 60 cycle, alternating current circuit. The result is that when the motor operating on a 110-volt circuit is braked down from its synchronous speed of about 1200 R. P. M. to a ponograph speed of 78 or 80 R. P. M. (a slip of more than 90%), the resulting increase of current through the conductors is small because of the high impedance and is taken care of without undue overheating. Furthermore, because of the relatively large unsaturated iron sections, the motor operates substantially free from noise due to alternating current vibrations. In the operation of the motor it is not necessary to cut off the current when the turn-table is stopped as the stopping of the rotor does not result in greater heating of the windings, for while the current drawn by the motor when the rotor is stopped is much greater than when it is running at synchronous speed, the change in the current drawn with change of speed is small during the first part of the speed range between zero and synchronous speeds. Furthermore, it is by reason of the low magnetic density and correspondingly high impedance of my motor that it can safely be operated at low speeds on 25 cycle alternating currents as well as on 60 cycle currents, the magnetic circuits of the motor being only partially saturated even when operating on 25 cycle current.

In my motor uniform speed is favored by the marked inertia or fly wheel effect secured by forming a large part of the iron circuit in the rotor structure. Also the motor in operation is free from overheating, its operation is practically silent and its torque is ample to insure a highly uniform turn-table speed notwithstanding voltage variations ranging as low as 75 volts and as high as 150 volts and regardless of the frequencies of the circuit within the range of 25 to 60 cycles per second. The ample character of the torque of my improved motors is evidenced by their rapid pick-up from rest to 80 R. P. M. in three to four seconds when operated at normal voltage.

As the motor above described produces ample torque for phonograph purposes when operated on 110-volt, single-phase current at any frequency ranging from 25 to 60 cycles per second and notwithstanding voltage variation over the wide range above mentioned, they are universally applicable, for phonograph drive, to all single-phase, 110-volt circuits in commercial use.

This application constitutes, in part, a continuation of my earlier application on electric phonograph motor, Serial No. 367,817, filed March 22, 1920.

While the motor construction illustrated herein is such as I prefer, it is to be understood that the construction shown can be widely varied without departing from the invention, the scope of the invention being indicated by the appended claims.

I claim:

1. In a phonograph, the combination of a record support, an induction motor comprising a stator and a rotor directly connected to rotate with the record support and drawing a primary circuit current variable with the motor speed, a current source of a definite voltage connected to the primary windings of the motor, said windings being of a suitable design for normal operation at synchronous speed at a much higher voltage, and governing means effective upon the rotor to limit its rotation to a speed much lower than the synchronous speed of the motor.

2. In a phonograph, the combination of a record support, an induction motor comprising a stator and a rotor directly connected to rotate with the record support and drawing a primary circuit current variable with the motor speed, a current source of definite voltage connected to the primary windings of the motor, said windings and the iron sections of the magnetic circuit of the motor being of suitable design for normal operation at synchronous speed at a much higher voltage, and governing means effective upon the rotor to limit its rotation to a speed much lower than the synchronous speed of the motor.

3. In a phonograph, the combination of a record support, an induction motor comprising a stator with split-phase windings and a rotor directly connected to rotate with the record support and drawing a primary circuit current variable with the motor speed, a single-phase current source of a definite voltage connected to the primary windings of the motor, said windings being of a suitable design for normal operation at synchronous speed at a much higher voltage, and governing means effective upon the rotor to limit its rotation to a speed much lower than the synchronous speed of the motor.

4. In a phonograph, the combination of a record support, an induction motor comprising a stator having split-phase windings and a rotor directly connected to rotate with the record support and drawing a primary circuit current variable with the motor speed, a single-phase current source of a definite voltage connected to the primary windings of the motor, said windings and the iron sections of the magnetic circuit of the motor being of suitable design for normal operation at synchronous speed at a much higher voltage, and governing means effective upon the rotor to limit its rotation to a speed much lower than the synchronous speed of the motor.

5. In a phonograph, the combination of a record support, an induction motor comprising a stator having split-phase windings and a squirrel-cage rotor directly connected to rotate with the record support, a single-phase current source of a definite voltage connected to the primary windings of the motor, the motor windings being of suitable design for normal operation at synchronous speed at a much higher voltage, and governing means effective upon the rotor to limit its rotation to a speed much lower than the synchronous speed of the motor.

6. In a phonograph, the combination of a record support, an induction motor comprising a stator having split-phase windings and a squirrel-cage rotor directly connected to rotate with the record support, a single-phase current source of a definite voltage connected to the primary windings of the motor, the windings and the iron sections of the magnetic circuit of the motor being of suitable design for normal operation at synchronous speed at a much higher voltage, and governing means effective upon the rotor to limit its rotation to a speed much lower than the synchronous speed of the motor.

7. In a phonograph, the combination of a rotatable record support; a source of single-phase current with a frequency within the range of 25 to 60 cycles per second; an induction motor adapted to operate on currents with frequencies within said range, said motor having a primary circuit connected with the said current source and drawing a current variable with the motor speed and a rotor connected to drive and turn in unison with the record support; and a braking governor operating on the record support and rotor to hold their rotation at the desired phonograph speed below 100 R. P. M., the motor being characterized by operation at upward of 80% slip and by an apparent average air gap flux density of less than 10,000 lines per square inch.

8. In a phonograph, the combination of a rotatable record support; a source of single phase current with a frequency within the range of 25 to 60 cycles per second; an induction motor adapted to operate on currents with frequencies within said range, said motor having a primary circuit comprising split phase windings both of which are continuously directly connected to the current source and drawing a current variable with the motor speed and a rotor connected to drive and turn in unison with the record support; and a braking governor operating on the record support and rotor to hold their rotation at the desired phonograph speed below 100 R. P. M., the motor being characterized by operation at upward of 80% slip and by having an impedance high enough when drawing current from said source to limit the current to a value which will not produce injurious heating in the motor windings.

9. In an electrical system, the combination of a single phase circuit affording a source of current with a frequency within the range of 25 to 60 cycles per second; a split-phase induction motor the primary circuit current of which varies with the speed of rotation, said motor being adapted to operate below 100 R. P. M. on current within the said frequency range and having both of its primary circuit windings in operation constantly directly connected to the current source; and means resisting the rotation of the motor and causing it to operate at not less than 80% slip, said motor being characterized by an impedance high enough at the slip specified to limit the current to a value which will not produce injurious heating in the motor windings.

In testimony whereof, I hereunto affix my signature.

HARRY P. DORN.